United States Patent
Banerjee et al.

(10) Patent No.: US 6,728,718 B2
(45) Date of Patent: Apr. 27, 2004

(54) METHOD AND SYSTEM FOR RECOVERING DHCP DATA

(75) Inventors: Dwip N. Banerjee, Austin, TX (US); Vinit Jain, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 09/891,335

(22) Filed: Jun. 26, 2001

(65) Prior Publication Data

US 2002/0198881 A1 Dec. 26, 2002

(51) Int. Cl.[7] .............................................. G06F 17/30
(52) U.S. Cl. ......................................... 707/10; 709/239
(58) Field of Search .......................... 707/10, 227, 245; 709/218, 222, 225, 220, 239, 250; 713/201; 370/401

(56) References Cited

U.S. PATENT DOCUMENTS

| | | | |
|---|---|---|---|
| 6,195,706 B1 * | 2/2001 | Scott | 709/245 |
| 6,208,656 B1 * | 3/2001 | Hrastar et al. | 370/401 |
| 6,212,563 B1 * | 4/2001 | Beser | 709/227 |
| 6,219,715 B1 * | 4/2001 | Ohno et al. | 709/245 |
| 6,529,517 B2 * | 3/2003 | Hrastar et al. | 370/401 |

* cited by examiner

*Primary Examiner*—Diane D. Mizrahi
(74) *Attorney, Agent, or Firm*—Joseph P. Lally; Diana L. Roberts; Volel Emile

(57) ABSTRACT

A system in which a DHCP server executes a recovery routine after detecting a corrupted IP address state database. The routine determines whether an IP address is assigned to a DHCP client by querying an IP address/port reserved for DHCP clients. If the response suggests the absence of a DHCP client, the address is marked as BAD. If the response suggests the presence of a DHCP client, the IP database is updated appropriately. The query may comprise sending a TCP/IP packet to the IP address and port and monitoring for an ICMP error message. In another embodiment requiring a protocol extension, the DHCP server issues a DHCP supported query to each IP address that responds to a ping command. The DHCP clients supporting this protocol extension will respond to the query by returning all of the DHCP configuration information that was acquired before the IP address state database crashed.

28 Claims, 3 Drawing Sheets

| IP AD-DRESS 202 | CLIENT ID 204 | | LEASE 206 | STATE 208 |
|---|---|---|---|---|
| 9.3.149.1 | 01-057 | | | RESERVED |
| 9.3.149.2 | 01-224 | | 1848 | LEASED |
| 9.3.149.3 | 01-027 | | | RELEASED |
| 9.3.149.4 | 01-121 | | | EXPIRED |
| 9.3.149.5 | | | | BAD |
| | | | | |
| 9.3.149.60 | | | | |

106

METHOD AND SYSTEM FOR RECOVERING DHCP DATA

BACKGROUND

1. Field of the Present Invention

The present invention is generally related to the field of data processing networks and more particularly to the recovery of network information and, more specifically, network address information following a loss of data.

2. History of Related Art

In the field of data processing networks, the use of network addresses to identify various devices attached to the network is well known. The Dynamic Host Configuration Protocol (DHCP) is a communications protocol that facilitates the management and assignment of Internet Protocol (IP) addresses in an organization's network. Using the Internet Protocol, each machine that can connect to an IP supported network needs a unique IP address. When a data processing device connects to the network, it must be assigned an IP address. Without DHCP, the IP address of each device would have to be entered manually. If a device were moved to another location in the network, a new IP address would have to be entered. DHCP lets a network administrator supervise and distribute IP addresses from a central point and automatically sends a new IP address when a device is plugged into a different place in the network. IP is documented in the Internet Engineering Task Force (IETF) Request for Comment (RFC) 791 while the existing DHCP specification is documented in RFCs 2131 and 2132, all of which are incorporated by reference herein.

DHCP uses the concept of a "lease" or amount of time that a given IP address will be valid for a client. The lease time can vary depending on how long a user is likely to require the IP address at a particular location. The lease concept is useful in environments where users change frequently. Using short leases, DHCP can dynamically reconfigure networks in which there are more clients than there are available IP addresses.

In a conventional network environment using DHCP to manage its IP addresses, one or more DHCP servers do the actual assignment and tracking of IP addresses. Each DHCP server maintains and uses a database containing IP address information. If this database is corrupted, the administrator will typically restart the DHCP server without the IP address state database, which can result in the following scenario.

Imagine that a first client, (Client A) on the network was assigned an IP address with a relatively long lease before the DHCP database became corrupted. Because the lease was not close to expiring, Client A will not have issued a renewal request for the IP address. After the DHCP server restart, a second client, Client B, issues a DHCP Discover packet to initiate the process of acquiring an IP address. The DHCP server may try to issue Client B the same IP address as Client A (because the server is no longer aware that the IP address was assigned to Client A). Before doing so, however, the DHCP server will "ping" the appropriate IP address to see if there is a device currently assigned to the address. Because the DHCP sever assigned Client A the IP address of interest before the IP address state database crash, the ping will generate a response. Upon receiving the response, the DHCP server will update the IP address state database to indicate that the IP address has a status of BAD, meaning that the address is unavailable and that it was assigned by another server. This status is incorrect since the address was assigned by the DHCP server. Thus, the conventional method of recovering from a corrupted IP address state database results in a database that does not accurately reflect the state of the network. It would therefore be desirable to implement a method and system to recover from an IP address state database crash that produced a more accurate database following recovery.

SUMMARY OF THE INVENTION

The problems identified above are in large part addressed by a method and system in which a DHCP server executes a recovery routine upon discovering a corrupted IP address state database. One embodiment of the invention complies with the existing DHCP protocol while a second embodiment extends the protocol to support a server initiated, DHCP-specific query. The recovery routine may attempt to determine whether an IP address is assigned to a DHCP client by sending a packet to a particular port at the IP address where the port is generally reserved for DHCP client processes. Depending upon the response that the packet generates, the server can determine whether a DHCP client is present at the IP address and can update the database accordingly.

In an embodiment that complies with the existing protocol, the query may comprise simply sending a TCP/IP packet to the appropriate IP address and port and monitoring for an Internet Control Message Protocol (ICMP) error message. If an ICMP error message results, the server assumes that the process at the address and port is not a DHCP client. The lack of an ICMP error message would suggest the presence of a DHCP client. In either event, the server can update the IP address state database accordingly.

In an embodiment that extends the existing DHCP protocol, the DHCP server issues a DHCP supported query to each IP address that responds to a ping command. The DHCP clients supporting this protocol extension will respond to the query by returning all of the DHCP configuration information that was assigned before the IP address state database crashed. In this manner, the IP address state database can be recovered. In either case, the IP address state database that is created following restart includes information that is more accurate than the information conventionally generated after a database crash in which it is assumed that all IP addresses responding to a ping command are bad.

BRIEF DESCRIPTION OF THE DRAWINGS

Other objects and advantages of the invention will become apparent upon reading the following detailed description and upon reference to the accompanying drawings in which.

Figures 1, 2:
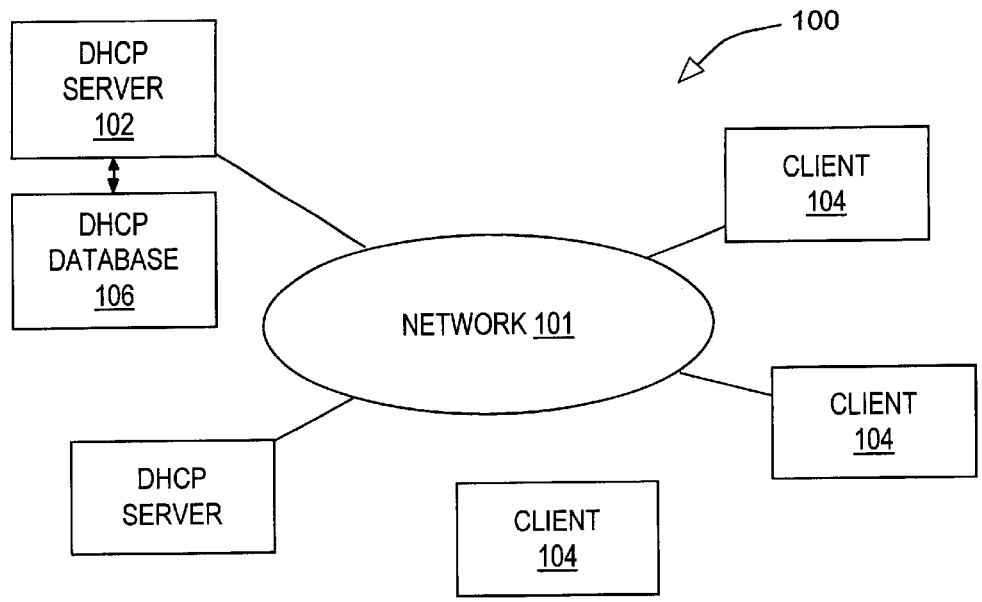
FIG. 1 is a block diagram of selected elements of a data processing network suitable for use with one embodiment of the present invention.
FIG. 2 is a conceptual illustration of an IP address state database.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 is a block diagram of selected features of a data processing network 100 suitable for use with the present invention. In the depicted embodiment, network 100 includes one or more clients 104 and one or more DHCP servers 102 interconnected via a network medium represented in FIG. 1 by reference numeral 101. Network 100 may represent a local area network in which case the network 101 may comprise an Ethernet or other suitable local network medium. Alternatively, network 100 may represent a wide area network such as the Internet, in which case, network medium 101 may include multiple interconnected local area networks and the intervening routers, hubs, gateways, etc.

Each client 104 may represent not only a data processing device including processor, memory, and appropriate I/O devices, but also a dedicated piece of software (the DHCP client daemon) that communicates with DHCP server 102 to acquire an IP address and other configuration information for client 104 when client 104 connects to network 100. Similarly, each DHCP server 102 may include both the DHCP server code (the DCHP server daemon) and the device or hardware on which it executes. Thus, portions of the present invention may be implemented as a set of computer executable instructions (software) stored on a computer readable medium including volatile mediums such as the system memory (DRAM) or cache memory (SRAM) of DHCP server 102 and non-volatile mediums including floppy diskettes, hard disks, CD ROMs, DVDs, magnetic tapes, and other suitable mediums.

In many networks, there is a scarcity of available IP addresses. It is not uncommon in education and other environments to have far more users than IP addresses. DHCP provides a protocol for automatically managing and assigning relatively scarce IP addresses to users or clients that are currently using the network. To accomplish this task, DHCP server 102 maintains and uses an IP address state database 106 that includes information about each of the IP addresses that is available to the server.

Referring to FIG. 2, a conceptual representation of an IP address state database 106 is depicted. In the depicted embodiment, database 106 is a table in which each row represents an IP address that is available to the DHCP server 102 and each column is a different field of information. Database 106 includes an IP address field 202, a client ID field 204, a lease field 206, and a state field 208.

The IP address field 202 contains all of the IP addresses that are managed by DHCP server 102. The client ID field contains information that uniquely identifies the client associated with the corresponding IP address. If DHCP server 102 assigned the IP address under consideration, it completes the information in client ID field 204. If the IP address was assigned by another DHCP server or in some other manner, the client ID field may be blank.

Typically, client ID field 204 includes a type portion that identifies the type of network interface card and an address portion that represents a hardware address of the network interface card. The type portion may indicate, for example, that the network interface card of the corresponding client is an Ethernet interface while the address portion may represent the Media Access Control (MAC) address of the network interface card.

Lease field 206 may include information indicating when the lease for the corresponding IP address expires. As indicated previously, DHCP supports the concept of leased IP addresses. Leases promote efficient re-use and termination of IP addresses. If a client 104 that is assigned a particular IP address by DHCP server 102 loses power or is otherwise disconnected from the network before sending a DHCP release packet, the assigned IP address would remain bound to the client until such time as the client powered on and issued the release packet to the server. Leased IP addresses prevent such a situation by establishing a time by which the server will cancel a client's IP address assignment. Thus, lease field 206 typically includes a duration of time indicating the end of the corresponding IP address assignment. Clients that are actively connected to the network may prevent termination of their IP address assignments by renewing the lease before the expiration of the previous lease using appropriate DHCP packets.

The state field 208 of IP address state database 106 indicates one of various possible states of the corresponding IP address. These states typically include a LEASED state indicating that the IP address is currently assigned to a client, a RESERVED state indicating that the IP address has been offered to a client but not yet accepted, a RELEASED state indicating that the IP address assignment was terminated at the client's request, and an EXPIRED state indicating that the IP address was terminated by the DHCP server because the lease duration expired without a proper renewal request from the client. Additional possible values of the state field 208 include a BAD state indicating an unavailable IP address that was not assigned by the DHCP server and a FREE state indicating that the corresponding IP address is available for assignment by the server.

Typically, IP address state database 106 is stored in a non-volatile storage medium such as a hard disk that is accessible to DHCP server 102. The size of IP address state database 106 increases with the number of IP addresses managed by DHCP server 102. In addition, IP address state database 106 is a dynamic database that changes each time an IP address assignment changes. In a large network, the changes to IP address state database 106 may occur relatively frequently. If the disk on which IP address state database 106 resides crashes or becomes corrupted, there is not typically a backup copy of the database containing the most recent information. Under these circumstances, it is the responsibility of DHCP server 102 to recover the database. The present invention contemplates a method and system and for doing so.

Generally speaking, the method and system contemplated by the present invention attempts to recover a lost or corrupted IP address state database following. The available IP addresses are queried to determine more information than is obtainable by merely pinging the IP addresses to determine if the IP address is assigned. In one embodiment, the IP address state database information is obtained without altering or modifying the existing DHCP specification while a second embodiment contemplates an extension to the existing protocol. In both embodiments, the method includes querying each IP address that responds to a ping command following an IP address state database crash. The DHCP server updates the IP address state database to reflect state information obtainable from the query response.

Figure 3:
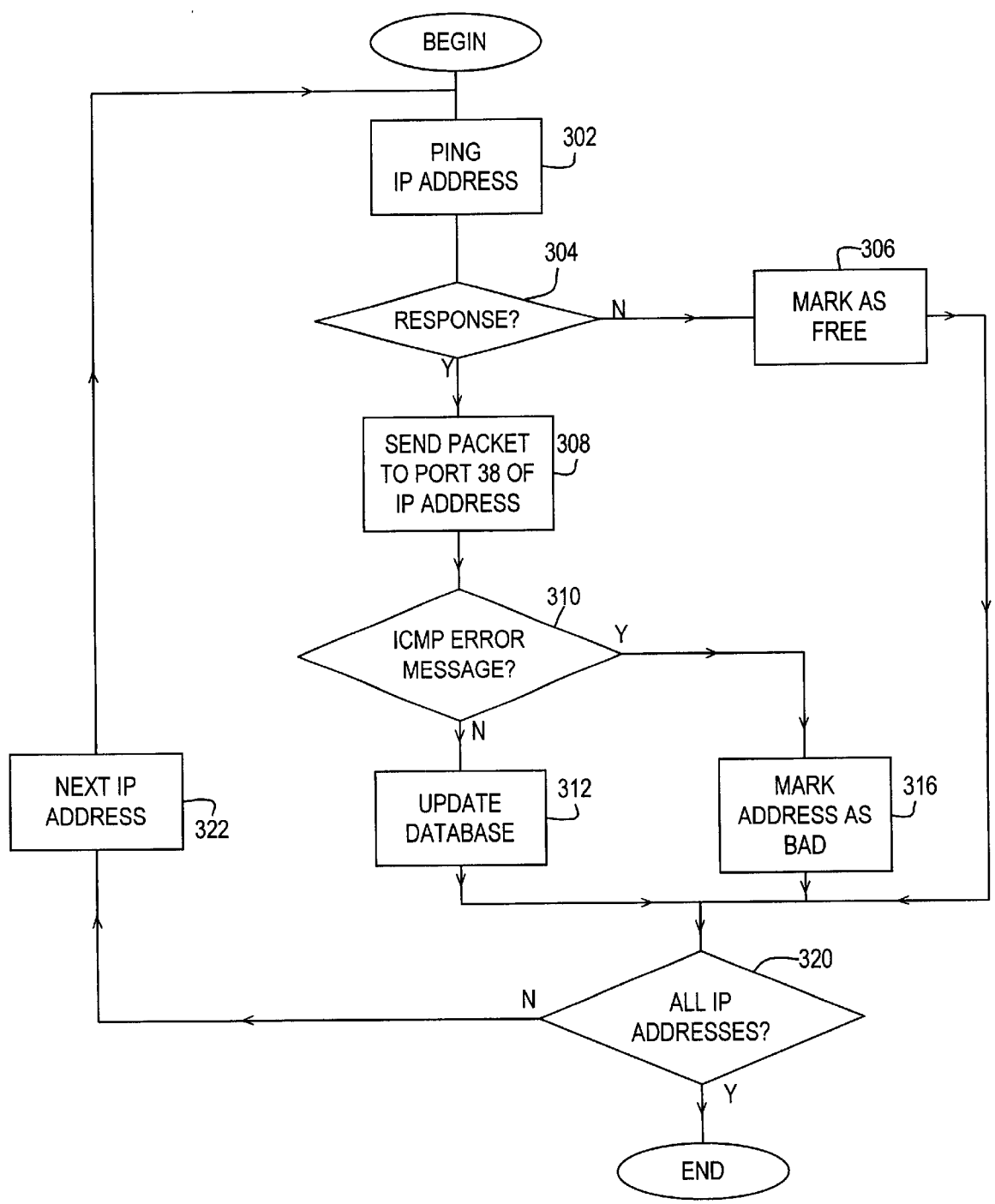
FIG. 3 is a flow diagram of a method of recovering an IP address state database according to one embodiment of the invention.

Turning now to FIG. 3, a flow diagram illustrating a method 300 of recovering IP address information following the loss or corruption of an IP address state database is presented. The method 300 illustrated may be executed whenever DHCP server 102 is restarted or whenever the IP address state database 106 is lost or becomes corrupted. The method is typically repeated for each IP address in IP address state database 106 (i.e., for each IP address managed by DHCP server 102) as indicated in blocks 320 and 322.

Following a restart of DHCP server 102 or following a determination that IP address state database 106 is corrupted, a DHCP server 102 pings (block 302) the current IP address. If the IP address does not respond to the ping (block 304), the IP address is marked as FREE (block 306) in IP address state database 106. If a ping response is detected, DHCP server 102 according to the present invention sends an additional query (block 308) to the IP address to determine if the IP address is assigned to a DHCP client.

The method illustrated in FIG. 3 is suitable for use with the existing DHCP specification. In this embodiment, DHCP server 102 queries an IP address by assuming that the IP address is assigned to a DHCP client and addressing a packet to that client. More specifically, DHCP server 102 sends (block 308) a packet to a specific port number at the IP address under consideration where the port number is the port number typically reserved for DHCP client daemons.

The DHCP protocol specifies that DHCP messages from a client to a server are sent to a 'DHCP server' port (67), and DHCP messages from a server to a client are sent to the 'DHCP client' port (68). If DHCP server 102 is able to send a packet to port 68 of the IP address under consideration without receiving an ICMP error message, then there is an active DHCP client at the IP address. Thus, if no error message is detected following the packet transmission in block 308, server 102 determines (block 310) that a DHCP client has been found and updates (block 312) IP address state database 106 to reflect a DHCP client at the appropriate IP address. In contrast, the conventional database recovery mechanism would mark the IP address as BAD upon detecting a ping response. The indication of a DHCP client at this IP address in IP address state database 106 more accurately reflects the state of the network. When the client at this IP address eventually issues a RENEWAL request, DHCP server 102 will be able to respond to the request. If the packet sent in block 308 produces an ICMP error message, the server then marks (block 316) the IP address as BAD in its database.

Figure 4:
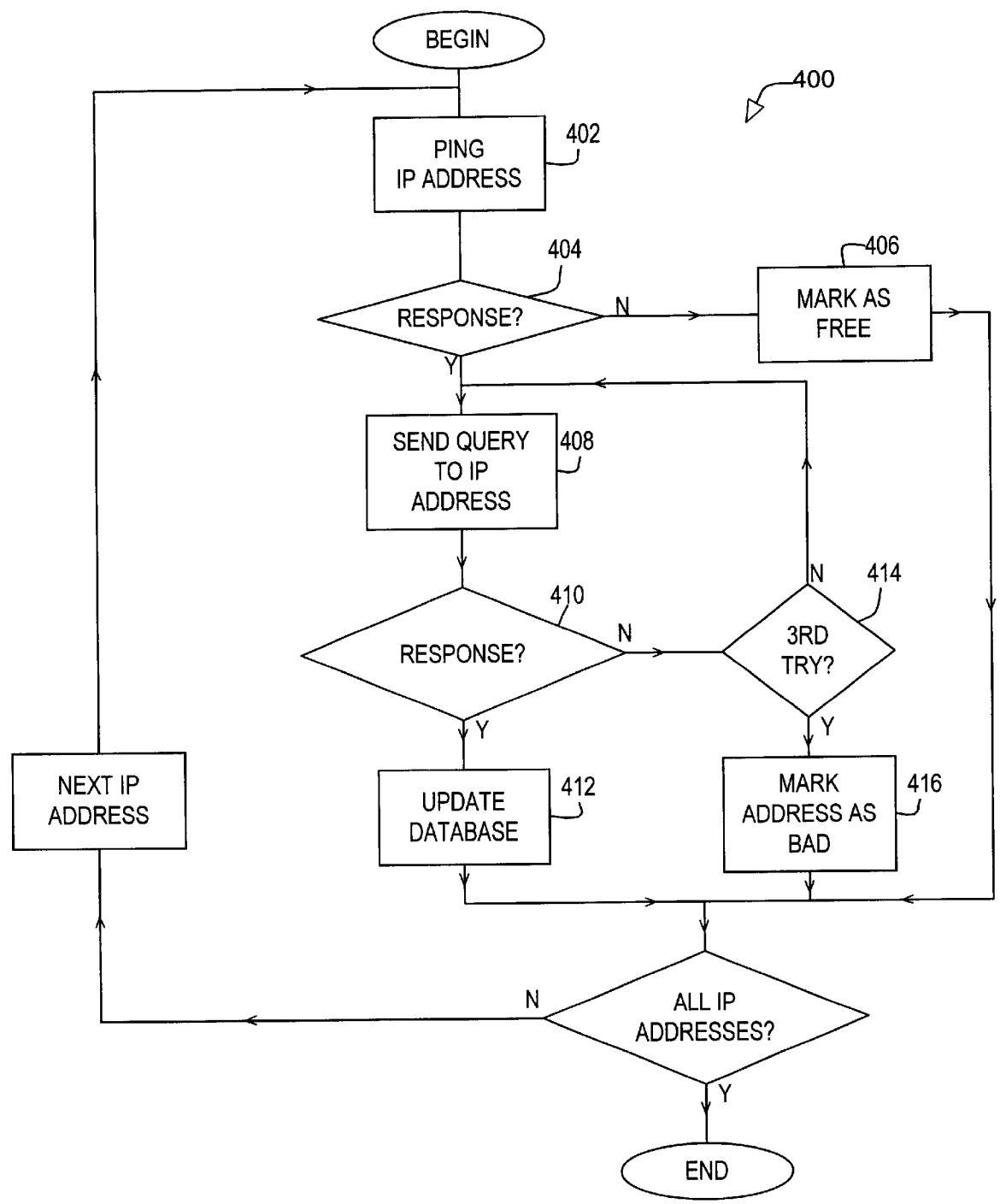
FIG. 4 s a flow diagram of a method of recovering an IP address state database according to one embodiment of the invention.

Turning now to FIG. 4, a second method 400 for recovering an IP address state database is depicted. Method 400 is roughly analogous to the method 300 depicted in FIG. 3, but method 400 contemplates an extension of the existing DHCP protocol to enable more accurate recovery of the IP address state database. In this embodiment, a ping is sent (block 402) to each IP address. If there is no ping response (block 410), the IP address is marked as BAD in the IP address state database. If there is a ping response, a server-initiated query is issued in block 408 where the query represents an extension of DHCP supported by server 102 and client 104 that requests configuration information from a DHCP client. (This request is referred to herein as a DHCP QUERY). In this embodiment, DHCP client 104 is enabled to respond to the DHCP QUERY by returning the DHCP configuration information that the server assigned to the client before the IP address state database became corrupted.

Thus, DHCP server 102 sends (block 408) a DHCP QUERY to the IP address under consideration. If a DHCP client 104 receives the DHCP QUERY, the client will respond by returning its DHCP configuration information to DHCP server 102. The DHCP configuration information may include information relevant to each of the fields identified in FIG. 2 including lease time information and lease status information. The DHCP server will then update (block 412) the IP address state database with the information retrieved from the DHCP client. In this manner, an extension of the DHCP protocol permits DHCP server 102 to recover its IP address state database fully and accurately following a crash.

If the DHCP QUERY does not reach a DHCP client, no response to the query will be detected by DHCP server 102. In this case, DHCP server 102 may re-send the DHCP QUERY a predetermined number of times. In compliance with the DHCP specification, the DHCP QUERY is typically attempted a maximum of three times (block 414). If no response to the DHCP QUERY is detected after the third attempt, the DHCP server updates the database to indicate the relevant IP address as BAD.

In both embodiments, the DHCP server determines whether there is a presence at an IP address, querying the IP address (either by sending a packet as indicated in block 308 or a DHCP QUERY in block 408), and, based on a response to the query, updating the IP address state database.

It will be apparent to those skilled in the art having the benefit of this disclosure that the present invention contemplates a method and system for recovering a corrupted IP address state database is discussed. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of recovering an IP address state database, comprising:
   determining the presence of a device at an IP address;
   querying the IP address to determine if the device comprises a DHCP client by sending a packet to a DHCP client port of the IP address; and
   depending upon a response to the query, updating the IP address state database to reflect a DHCP client.

2. The method of claim 1, wherein determining the presence of a device comprises ping the IP address and detecting a ping response.

3. The method of claim 2, further comprising marking the IP address as FREE in the database responsive to detecting no ping response.

4. The method of claim 1, wherein querying the IP address by sending a packet to a DHCP client port of the IP address further comprises monitoring for an error message.

5. The method of claim 4, wherein, responsive to detecting the error message, the IP address is marked as BAD in the IP address state database.

6. The method of claim 5, wherein the error message comprises an ICMP error message.

7. The method of claim 4, wherein, responsive to detecting no error message, updating the IP address state database comprises marking the IP address as a DHCP client in the database.

8. The method of claim 1, wherein querying the IP address comprises sending a QUERY to the IP address requesting DHCP configuration information and monitoring for a response.

9. The method of claim 8, wherein responsive to detecting no response to the QUERY, resending the QUERY a predetermined number of times.

10. The method of claim 9, wherein, upon resending the QUERY the maximum number of times without receiving a response, updating the IP address state database comprises marking the IP address as BAD in the database.

11. The method of claim 8, wherein, upon receiving a response to the QUERY updating the IP address state database includes storing the DHCP configuration for the IP address in the database.

12. The method of claim 11, wherein the DHCP configuration information includes DHCP lease information for the IP address.

13. A computer program product comprising a set of computer executable instructions for recovering an IP address state database for a computer network stored on a computer readable medium, comprising:

computer code means for determining the presence of a device at an IP address;

computer code means for querying the IP address to determine if the device comprises a DHCP client by sending a packet to a DHCP client port of the IP address; and computer code means for updating the IP address state database to reflect a DHCP client depending upon a response to the query.

14. The computer program product of claim 13, wherein the code means for determining the presence of a device comprises code means for pinging the IP address and detecting a ping response.

15. The computer program product of claim 14, further comprising computer code means for marking the IP address as FREE in the database responsive to detecting no ping response.

16. The computer program product of claim 13, wherein the code means for querying the IP address by sending a packet to a DHCP client port of the IP address further comprises code means for monitoring for an error message.

17. The computer program product of claim 16, wherein, the computer code means mark the IP address as BAD in the IP address state database responsive to detecting the error message.

18. The computer program product of claim 17, wherein the error message comprises an ICMP error message.

19. The computer program product of claim 16, wherein the computer code means for updating the IP address state database comprises code means for marking the IP address as a DHCP client in the database responsive to detecting no error message.

20. The computer program product of claim 13, wherein the code means for querying the IP address comprises code means for sending a QUERY to the IP address requesting DHCP configuration information and monitoring for a response.

21. The computer program product of claim 20, wherein the code means for updating the IP address state database includes code means for storing the DHCP configuration for the IP address in the database upon receiving a response to the QUERY.

22. The computer program product of claim 21, wherein the DHCP configuration information includes DHCP lease information for the IP address.

23. A DHCP server in a computer network including processor and storage means, the storage means including a set of computer executable instructions for recovering an IP address state database for a computer network stored on a computer readable medium, comprising:

computer code means for determining the presence of a device at an IP address;

computer code means for querying the IP address to determine if the device comprises a DHCP client by sending a packet to a DHCP client port of the IP address; and computer code means for updating the IP address state database to reflect a DHCP client depending upon a response to the query.

24. The DHCP server of claim 23, wherein the code means for determining the presence of a device comprises code means for pinging the IP address and detecting a ping response.

25. The DHCP server of claim 24, further comprising computer code means for marking the IP address as FREE in the database responsive to detecting no ping response.

26. The DHCP server of claim 23, wherein the code means for querying the IP address by sending a packet to a DHCP client port of the IP address further comprises code means for monitoring for an error message.

27. The DHCP server of claim 23, wherein the code means for querying the IP address comprises code means for sending a QUERY to the IP address requesting DHCP configuration information and monitoring for a response.

28. The DHCP server of claim 27, wherein the code means for updating the IP address state database includes code means for storing the DHCP configuration for the IP address in the database upon receiving a response to the QUERY.

* * * * *